Aug. 1, 1967     D. P. TUFFNELL     3,333,698
PRESSURE RELIEF VALVE ASSEMBLIES
Filed July 12, 1965
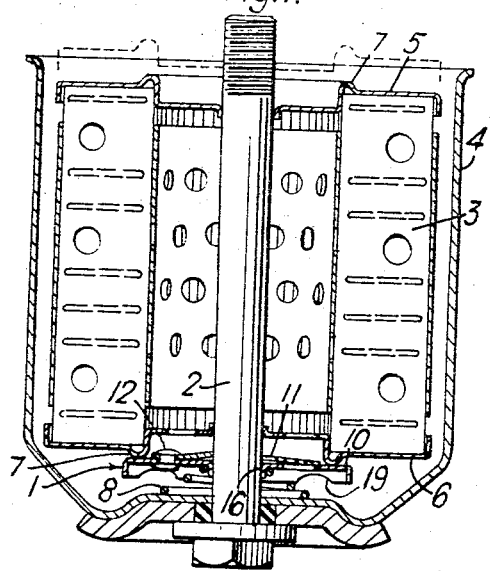
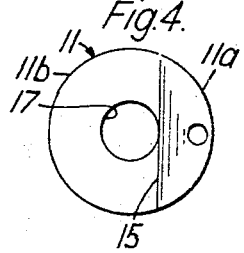
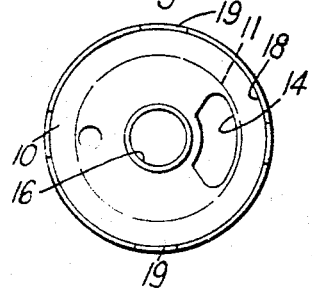
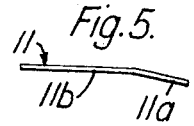
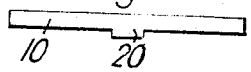
Inventor
Derrick Percival Tuffnell
BY   G. E. Johnson
Attorney

United States Patent Office 3,333,698
Patented Aug. 1, 1967

3,333,698
PRESSURE RELIEF VALVE ASSEMBLIES
Derrick Percival Tuffnell, Chandlers Ford, England, assignor to General Motors Corporation, Detroit, Mich., a corporation of Delaware
Filed July 12, 1965, Ser. No. 471,153
Claims priority, application Great Britain, July 17, 1964, 29,251/64
2 Claims. (Cl. 210—130)

ABSTRACT OF THE DISCLOSURE

A relief valve for a filter assembly comprising a plate having a spring plate valve thereon and an annular notched rim at the periphery thereof constructed to allow flow through the notch on clogging of the filter element, if the valve has been assembled wrong-side-up.

---

This invention relates to pressure relief valve assemblies, and in particular to pressure relief valve assemblies for use in liquid filters such as are commonly employed in the lubrication systems of internal combustion engines.

A pressure relief valve assembly in accordance with the invention comprises a retainer plate adapted to be pressed against and form a seal with one end of an annular filter element and a spring plate secured at a point near its edge to said retainer plate so that a portion of said spring plate remote from said point overlies and seals an aperture in said retainer plate.

Preferably the assembly is made so that it is a sliding fit on a centre bolt which extends through the filter element and by which a housing for the element may be secured to a mount face.

The plates are preferably of annular form; and one part of the spring plate which includes the point of attachment is in a plane inclined at a small angle to the other part of the spring plate along a line which is a chord of the circular outer periphery of the plate; the chord is preferably tangential to the inner periphery of the annular spring plate.

The size of the aperture in the retainer plate can be varied to predetermine the operating pressure at which the relief valve assembly will open, that is the pressure at which the spring plate overlying the aperture will be deflected to permit the passage of liquid therethrough.

The retainer plate is conveniently formed with a relatively narrow downturned rim and the depth of the rim is preferably varied so as to form one or more notches therein or tabs thereon so that, if the relief valve assembly is inadvertently fitted the wrong way round, liquid may flow through the valve assembly by way of the notches and thereby avoid a stoppage of the flow of liquid after the filter element has become blocked.

The scope of the invention is defined by the appended claims; and the invention and the method by which it is to be performed are hereinafter particularly described with reference to the accompanying drawings in which:

FIGURE 1 is a vertical section through an internal combustion engine oil filter assembly incorporating a pressure relief valve according to the invention;

FIGURE 2 is a vertical section through the relief valve assembly shown in FIGURE 1;

FIGURE 3 is an inverted plan of FIGURE 2;

FIGURE 4 is a plan view of the valve plate of the valve assembly shown in FIGURES 2 and 3;

FIGURE 5 is an end elevation of FIGURE 4; and

FIGURE 6 is an elevation of a modified form of the retainer plate forming part of the valve assembly.

FIGURE 1 shows an oil filter assembly in which a relief valve assembly 1 according to the invention is mounted on the centre bolt 2 by which the oil filter assembly is secured to an engine mount face (not shown), the centre bolt 2 extending through the relief valve assembly 1 and through the central opening in an oil filter element 3 which is arranged in a filter casing 4.

The filter element 3 has annular metal end caps 5, 6 at opposite ends thereof, each end cap having adjacent its inner periphery an annular ridge 7, the relief valve assembly being pressed into engagement with the annular ridge 7 on the end cap adjacent the base of the filter casing by a helico-spiral spring 8 mounted on the centre bolt and abutting at one end against the base of the casing 4 and at its other end against the relief valve assembly 1.

As shown in FIGURES 3 to 5 the relief valve assembly comprises an annular retainer plate 10 and a spring plate 11 secured at a point near to its edge to said retainer plate by means of a rivet 12, so that a portion of the spring plate remote from the rivet 12 overlies and seals an aperture 14 (FIGURE 3) in said retainer plate 10.

One part 11a of the spring plate 11 which includes the point of attachment by the rivet 12 is in a plane inclined at a small angle to the other part 11b of the spring plate along a line 15 which is a chord of the circular outer periphery of the plate. The chord 15 is preferably tangential to the inner peripheral portion of the annular retainer plate 10. The central opening 16 in the retainer plate 10 is preferably formed as shown with a short integral neck 16 formed by turning over the edge of the metal adjacent the opening; and the opening 16 is made to be a sliding fit on the centre bolt 2 of the filter assembly, the turned over edge 16 forming a seat for one end of the spring 8.

The size of the valve aperture 14 in the retainer plate 10 can be varied to predetermine the operating pressure at which the relief valve assembly 1 will open, that is, the pressure at which the spring plate 11 overlying the aperture 14 will be deflected to permit the passage of liquid therethrough.

The retainer plate 10 is conveniently formed with a relatively narrow down-turned rim 18 and the rim 18 is preferably formed with one or more notches 19 therein so that, if the relief valve assembly 1 is inadvertently fitted the wrong way round, liquid may flow through the valve assembly 1 by way of the notches 19 and thereby avoid a stoppage of the flow of liquid after the filter element has become blocked.

In use, the relief valve assembly 1 is fitted over the centre bolt 2 by which the oil filter housing 4 is secured to the engine mount face and is pressed by the spring 8 against the annular bead 7 on the end cap 6 at one end of the filter element 3. The deformation of the spring plate 11 ensures that the free portion 11b thereof is pressed into engagement with the retainer plate 10 so that the part 11b of the spring plate overlies the aperture 14 in the retainer plate 10 and seals the latter.

When a predetermined pressure is developed within the filter casing the spring plate 11 is deflected and oil can flow by way of the aperture 14 in the retainer plate 10 through the central passage in the filter element and thereby bypass the filter element.

As shown in FIGURE 6, as an alternative to the provision of notches in the downturned rim 18 of the retainer plate 10 the latter may be formed with tabs 20 which, in the same way as the notches, will ensure that if the valve assembly is fitted the wrong way round on the element liquid can still flow through the central opening in the filter element after the latter has become blocked.

In order to improve the sealing between the contacting surfaces of the spring plate 11 and the retainer plate 10 in the region of the opening 14 in the retainer plate 10, a layer of synthetic rubber or other plastics material (not shown) may be applied to one or both of said faces.

I claim:

1. A liquid filter relief valve assembly comprising a retainer plate adapted to be pressed against and form a seal with one end of an annular filter element, an aperture in said retainer plate, a spring plate secured to said retainer plate on one side thereof so that a portion of the spring plate overlies and resiliently seals said aperture, said retainer plate having a diameter smaller than the filter element diameter and having an annular rim on the side thereof opposite said one side with a cut-out portion so that, if the relief valve assembly is inadvertently fitted the wrong way round with respect to said filter element, liquid may flow around the spring plate by way of the said cut-out portion.

2. A liquid filter relieve valve assembly as set forth in claim 1, said cut-out portion being in the form of a notch in said rim.

References Cited
UNITED STATES PATENTS 2,057,932 10/1936 Bolser _____ 210—133
3,077,715 2/1963 Carroll _____ 55—313 X

FOREIGN PATENTS 1,111,643 11/1955 France.
956,817 4/1964 Great Britain.

SAMIH N. ZAHARNA, *Primary Examiner.*

REUBEN FRIEDMAN, *Examiner.*

F. A. SPEAR, *Assistant Examiner.*